United States Patent
Kolmanovsky et al.

(10) Patent No.: US 6,304,812 B1
(45) Date of Patent: Oct. 16, 2001

(54) CALIBRATION OPTIMIZATION METHOD

(75) Inventors: Ilya Vladimir Kolmanovsky, Ypsilanti; Jing Sun, Bloomfield Township; Michiel Jacques van Nieuwstadt, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/560,735

(22) Filed: Apr. 28, 2000

(51) Int. Cl.$^7$ .............................. F02D 41/14; F01N 3/00
(52) U.S. Cl. ........................ 701/103; 701/107; 60/274; 60/276
(58) Field of Search .................................... 701/103, 108, 701/109, 107, 101; 60/274, 276, 285, 602; 123/480, 672, 674, 679

(56) References Cited

U.S. PATENT DOCUMENTS

| | | | |
|---|---|---|---|
| 5,778,666 | * 7/1998 | Cullen et al. | 60/274 |
| 5,941,211 | * 8/1999 | Brehob et al. | 123/325 |
| 6,079,204 | * 7/2000 | Sun et al. | 60/274 |
| 6,186,124 | * 2/2001 | Stefanopoulou et al. | 123/492 |
| 6,188,944 | * 2/2001 | Kolmanovsky et al. | 701/54 |

OTHER PUBLICATIONS

"Optimal Operation Strategies for Hybrid Powertrains", by L. Guzzella et al, Proceedings of IFAC Workshop on Advanced in Automotive Control, Mohican State Park, Ohio, Feb. 1998, pp. 97–102.

"An Application of Optimization Methods to the Automotive Emissions Control Problem", by J. Sun et al, Proceedings of 1998 American Control Conference, Philadelphia, PA, Jun. 1998, pp. 1372–1377.

"Dynamic Modeling of a Three–Way Catalyst for SI Engine Exhaust Emission Control", by E.P. Brandt et al, IEEE Transactions on Control Systems Technology, vol. XX, No. Y, Month 1999, pp. 1–9.

"Dynamic Modeling of a Lean NOx Trap for Lean Burn Engine Control", by Y. Wang et al, Proceedings of 1999 American Control Conference, to appear, pp. 1–5.

"Optimization of Complex Powertrain Systems for Fuel Economy and Emissions", by Ilya Kolmanovsky et al, Proceedings of IEEE International Conference on Control Applications, Oct. 22, 1999, pp. 1–7.

SAE Paper No. 770075, "Engine Control Optimization for Best Fuel Economy with Emission Constraints", by E.A. Rishavy et al, 16 pp.

SAE Paper No. 790177, "Engine Control Optimization Via Nonlinear Programming", by Harish S. Rao et al, 1979, pp. 1–9.

SAE Paper No. 840544, "Optimal Control of Cold Automobile Engines", by A.I. Cohen et al, pp. 135–145.

SAE Paper No. 940151, "Automated System for Optimized Calibration of Engine Management Systems", by G. Schmitz et al, Feb. 28–Mar. 3, 1994, pp. 81–86.

SAE Paper No. 970289, "Analysis of the Fuel Economy Benefit of Drivetrain Hybridization", by Matthew R. Cuddy et al, 11 pp.

* cited by examiner

Primary Examiner—Andrew M. Dolinar
Assistant Examiner—Hieu T. Vo
(74) Attorney, Agent, or Firm—Jerome R. Drouillard

(57) ABSTRACT

An calibration optimization method for a direct injection spark ignition (DISI) engine with a lean $NO_x$ trap is disclosed. The method relies on a fixed structure optimization whereby reasonable powertrain operating policies are assumed and parametrized with a small number of variables with some of the variables playing the role of parameters for an inner loop optimization of an outer loop/inner loop two-stage optimization formulation. The values of the parameters are determined via a numerical solution of the resulting (outer loop) optimization to minimize the fuel consumption over the drive cycle subject to emission constraints.

20 Claims, 3 Drawing Sheets

CALIBRATION OPTIMIZATION METHOD

TECHNICAL FIELD

This invention relates to a method of optimizing powertrain operation and, more particularly, to a static calibration optimization method to improve fuel economy and emissions in a direct injection spark ignition (DISI) that is based on both the present operating conditions of the powertrain as well as the past operating history.

BACKGROUND ART

Stringent emission regulations and improved fuel economy and performance dictate more advanced powertrain configurations than standard port-fuel injected gasoline engines. Modern state-of-the-art powertrain systems may combine several power sources (internal combustion engines, electric motors, fuel cells, etc.) and various exhaust after-treatment devices (catalytic converters including lean NOx traps, particulate filters, etc.) in addition to conventional engine subsystems such as turbochargers and exhaust gas recirculation. The determination of the way in which these systems need be operated to meet driver's torque demand, performance and fuel economy expectations while satisfying federal emission regulations is a complex and a multi-objective optimal control problem.

The advanced powertrains are characterized by an increased number of control inputs as compared to the conventional powertrains and by significant subsystem interactions. As a result, optimizing the operation of these powertrains is significantly more difficult than optimizing a conventional powertrain. Additional complications arise due to the need to treat engine subsystems with energy or emission storage mechanisms, e.g., a battery or an emission trap. These storage mechanisms change the nature of the optimization task in a fundamental way.

Optimization procedures for the conventional gasoline or diesel powertrains are well known (e.g., Rao, H. S., Cohen, A. I., Tennant, J. A., and Voorhies, K. L., "Engine Control Optimization Via Nonlinear Programming", SAE Paper No. 790177; Rishavy, E. A., Hamilton, S. C., Ayers, J. A., Keane, M. A., "Engine Control Optimization for Best Fuel Economy with Emission Constraints", SAE Paper No. 770075; and Scmitz, G., Oligschlager, U., and Eifler, G., "Automated System for Optimized Calibration of Engine Management Systems", SAE Paper No. 940151). These references make extensive use of the "quasi-static" assumption that substantially simplifies the optimization problem. This "quasi-static" assumption is that the internal combustion engine fuel consumption and feedgas emission values at any given time instant are static functions of engine speed, engine torque and control variables (such as fueling rate, spark timing, EGR valve position, etc.) at the same time instant. Steady-state engine mapping data generated experimentally or from a high fidelity simulation model are typically used to develop these static functions. This "quasi-static" assumption is appropriate for establishing trends and relative effects for the warmed-up operation. Once the optimized strategies have been generated under the "quasi-static" assumption, the actual numbers for emissions and fuel economy are typically validated, either experimentally or on a more detailed powertrain simulation model that incorporates transient effects. This "quasi-static" assumption is also used as a basis for several simulation and modeling packages.

To illustrate the use of the "quasi-static" assumption, consider, for example, the optimization procedure for a conventional port-fuel injected (PFI) spark ignition engine equipped with a Three-Way-Catalyst (TWC). First the engine speed and engine torque trajectories are derived from a vehicle speed profile (FIG. 1) using the estimates of the vehicle mass, tire radius, aerodynamic drag coefficient, frontal area, rolling resistance coefficient, gear ratios, shift schedule, idle speed value and power losses in the drivetrain. The time trajectory of the engine speed ($N_e$) and the engine torque ($\tau_e$) is then a prescribed two dimensional vector $w(t)=[N_e(t)\tau_e(t)]^T$. Next, a discrete grid on the engine speed and engine torque values is introduced which divides the engine speed/engine torque plane into M rectangular cells, $C^i$, i=1, ..., M. Let T(i) be the total time the engine operates in the cell $C^i$ over the specified drive cycle while $w^i$ is the speed/torque vector corresponding to the center of the cell $C^i$. For each of the cells $C^i$, the values of the control inputs $u^i$ (fueling rate, spark timing, EGR rate, etc.) must be prescribed so that the fuel consumption over the drive-cycle is minimized while the emission constraints are met:

$$\sum_{i=1}^{M} W_f(u^i, w^i)T(i) \to \min \quad (1)$$

subject to $$\sum_{i=1}^{M} W_{s_j}(u^i, w^i)T(i) \leq g_j. \quad (2)$$

Here $W_f(u,w)$ denotes the fueling rate in gram per second, $W_{s_j}(u,w)$ is the mass flow rate of the jth regulated emission species (oxides of nitrogen ($NO_x$), carbon monoxide (CO) and hydrocarbons (HC)) out of the tailpipe in gram per second and $g_j$ is the emission limit for the jth species, j=1,2,3. The representation of the objective function and constraints as a sum of independent terms (separability property) has been made possible by the "quasi-static" assumption on the engine operation and a similar assumption on "quasi-static" behavior of the TWC conversion efficiencies (valid for engine operation around stoichiometry). The application of the Lagrange Duality reduces the problem to a two-stage (inner loop/outer loop) optimization problem. In the first stage (inner loop), for each cell $C^i$ the cost function of the form $$F^i(u^i, w^i, \lambda) = W_f(u^i, w^i) + \sum_{j=1}^{3} \lambda_j \left( W_{s_j}(u^i, w^i) - \frac{g_j}{T(i)} \right),$$

is minimized with respect to $u^i$, where $\lambda_j$ are the Lagrange multipliers. The same values of $\lambda_j$ are used for every cell. The optimization searches for a minimum either using regressions for $W_f$ and $W_{s_j}$ or directly on a finite set of experimental data points. Hence, a calibration is generated that prescribes the values of the control inputs $u^i=u^{i*}(\lambda)$ as functions of the Lagrange multipliers $\lambda_j$, j=1,2,3, and the value of the dual function $$\theta(\lambda)=\Sigma_{i=1}^{M} T(i)F^i(u^{i*}(\lambda),w^i,\lambda)$$

can be calculated. The outer loop of the optimization adjusts the Lagrange multipliers to achieve the desired objectives via the maximization of $\theta(\lambda)$. The feasibility of the powertrain is established if the maximum of $\theta$ exists at some value of $\lambda=\lambda^*$. Under appropriate additional assumptions the static calibration corresponding to $\lambda^*$, $u^{i*}(\lambda^*)$, provides the best emission constrained fuel economy over the specified drive cycle.

SUMMARY OF THE INVENTION

The present invention is directed to an optimization method for direct injection spark ignition (DISI) engine with a lean NOx trap wherein fuel consumption and tailpipe emissions are determined not just by the present operating conditions of the powertrain but also by the past operating history. This is because emission storage mechanism is critical to operation of this powertrain. Hence, the separability property that was crucial for efficient generation of the calibration for the conventional PFI engines is lost and the problem has to be treated as a dynamic optimal control problem. In a gasoline direct injected engine equipped with a lean $NO_x$ trap (LNT), there is an emission storage mechanism due to $NO_x$ storage in the trap under some operating conditions and $NO_x$ release from the trap under some other operating conditions.

The present invention relies on a fixed structure optimization whereby reasonable powertrain operating policies are assumed and parametrized with a small number of parameters. The general outer-loop/inner-loop, two-stage optimization formulation is preserved with some of the parameters playing the role of the weights for the inner loop optimization. The values of the parameters are determined via a numerical solution of the resulting (outer loop) optimization to minimize the fuel consumption over the drive cycle subject to emission constraints. The inner loop optimization refers to the process of generating normal mode and purge mode calibrations. This inner loop optimization is performed over the values of the air-to-fuel ratio, EGR rate, and spark timing at each speed/torque operating point using engine and aftertreatment models. The normal mode calibrations have to meet a $NO_x$ emission index bound which is adjusted by the outer loop optimization process. Specifically, the outer loop optimization is a process of adjusting the NOx emission index bound and purge activation threshold as needed to achieve best $NO_x$ emission constrained fuel economy over a simulated drive cycle. This fixed structure approach is adopted to make the problem computationally tractable and also to generate policies that do not explicitly depend on time. In addition, optimized fixed structure policies may often be less sensitive to parameter variations and uncertainties than the actual optimal policies.

BRIEF DESCRIPTION OF DRAWINGS

A more complete understanding of the present invention may be had from the following detailed description which should be read in conjunction with the drawings in which.

DETAILED DESCRIPTION OF PREFERRED EMBODIMENTS

Figure 1:
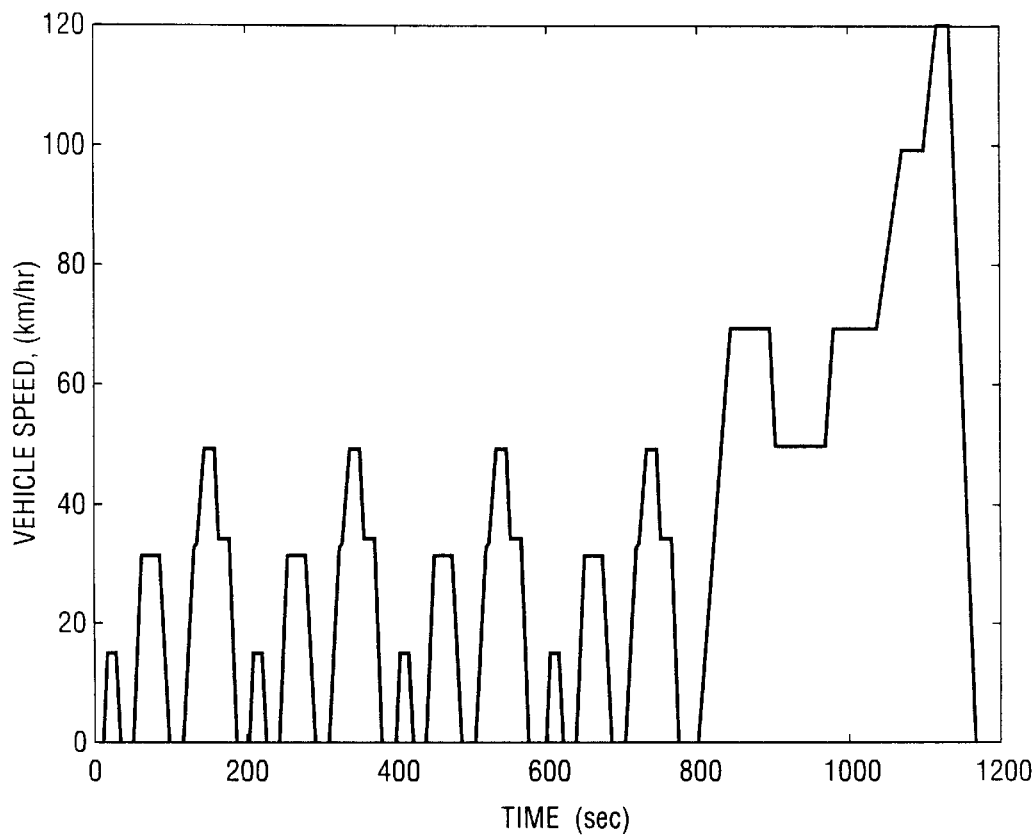
FIG. 1 shows a typical vehicle speed profile.
Figure 2:
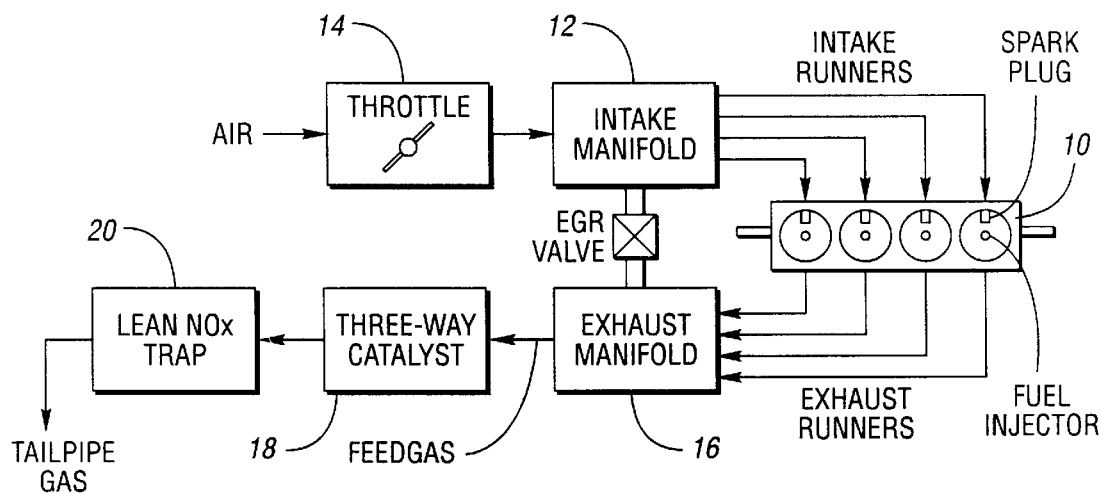
FIG. 2 is a schematic representation of a DISI engine.

Referring again to the drawings and in particular FIG. 2, a schematic of a gasoline direct injection spark ignition (DISI) engine is shown. Each cylinder of the engine 10 is provided with a fuel injector and a spark plug of conventional design. Air is provided to the engine through an intake manifold 12 under the control of a throttle 14. Control of the precise quantity of fuel to be injected in order to maintain a desired air/fuel ratio is determined by a controller (not shown). An exhaust system, comprising one or more exhaust runners, transports exhaust gas produced from combustion of an air/fuel mixture in the engine through an exhaust manifold 16 to a conventional close-coupled, three-way catalytic converter (TWC) 18. The converter 18, contains a catalyst material that chemically alters exhaust gas that is produced by the engine to generate a catalyzed exhaust gas. The catalyzed exhaust gas is fed through an exhaust pipe to a downstream lean NOx trap (LNT) 20 and thence to the atmosphere through a tailpipe. A portion of the exhaust gas is fed from the exhaust manifold 16 to the intake manifold 12 through an exhaust gas recirculation (EGR) valve 22 that is controlled by the controller.

The DISI engine can operate at extremely lean overall air-to-fuel ratios (up to 40:1 as compared to 14.64:1 for stoichiometric operation) due to its stratified combustion ability. This reduces pumping losses and increases thermodynamic efficiency of the cycle thereby improving fuel economy. The transition between homogeneous combustion and stratified combustion is accomplished by changing the fuel injection timing from early injection to late injection. At the same time, the lean operation renders the conventional three-way catalyst ineffective in reducing $NO_x$ emissions. Consequently, increased exhaust gas recirculation rates and additional exhaust after treatment devices such as a lean $NO_x$ trap are required. The LNT is only capable of trapping $NO_x$; and as it becomes filled with $NO_x$, its trapping efficiency decreases. Hence, the LNT has to be periodically purged of the stored $NO_x$ in a manner that the stored $NO_x$ (pollutant) is converted to nitrogen and carbon dioxide. The purge is accomplished by operating the engine with homogeneous combustion and air-to-fuel ratio richer than stoichiometry for several seconds. Although under the lean conditions the TWC is not very effective for NOx reduction, it does remain very effective for HC and CO reduction.

Engine and After-treatment Modeling

The model that is used for the optimization is based on the "quasi-static" assumption for the engine fuel consumption and feedgas properties while the dynamics are due to the exhaust after treatment (TWC and LNT) storage mechanisms. To simplify the exposition, it is assumed that the engine is fully warmed up and treatment is restricted to $NO_x$ emissions. This is done to simplify the exposition and also because $NO_x$ emissions represent a more difficult control problem for the lean burn operation, whilst the CO and HC emissions can be effectively handled by the TWC during the warmed-up operation. The model has the form:

$$\dot{x}=f(x,v),$$

$$y=H(x,v,w), \quad (3)$$

where $$x = \begin{bmatrix} x_{twc} \\ x_{lnt} \end{bmatrix}, \quad v = \begin{bmatrix} W_{tot} \\ \lambda \\ T \\ W_{NOx} \\ W_{CO} \\ W_{HC} \end{bmatrix}, \quad Y = \begin{bmatrix} W_f \\ \hat{W}_{NOx} \end{bmatrix},$$

and where $w=[N_e \ \tau_e]^T$, $x_{twc}$ is the mass of oxygen stored in the TWC, $x_{lnt}$ is the mass of $NO_x$ stored in the LNT, $W_{tot}$ is the mass flow rate of the exhaust gas out of the engine (feedgas), $\lambda$ is the feedgas air-to-fuel ratio, T is the feedgas temperature, $W_{NOx}$, $W_{CO}$, $W_{HC}$ are the mass flow rates of feedgas $NO_x$, CO and HC out of the engine, respectively, $N_e$ is the engine speed, $\tau_e$ is the engine torque, $W_f$ is the engine fueling rate and $\hat{W}_{NOx}$ is the mass flow rate of $NO_x$ out of the tailpipe. The vector v represents engine exhaust feedgas properties and, under the "quasi-static" assumption, can be related to the engine operating variables by a static nonlinear model of the form:

$$v = r(u, w), \quad (4)$$

where the vector u is defined as $u = [\lambda \; E \; \theta \; t_{ing}]^T$, E is the exhaust gas recirculation (EGR) rate, $\theta$ is the spark timing and $t_{inj}$ is the injection timing. In the static model, the fueling rate $W_f$ is treated as a dependent variable, i.e., it is always calculated so that the torque generated by the engine is equal to $\tau_e$. The injection timing $t_{inj}$ can take one of two discrete values that correspond to early injection for the homogeneous mode or late injection for the stratified mode. The range of variables u is constrained due to limits on the intake manifold pressure to be less than the atmospheric pressure, knock and misfire limits and constraints on the feasible flow quantities through the electronic throttle and EGR valve. These restrictions can be represented by inequality constraints of the form, $$h(u, w) \leq 0. \quad (5)$$

The objective is to minimize total fuel consumption over the drive cycle subject to a constraint on the cumulative tailpipe $NO_x$ emissions to be less than a specified bound.

Operating Policies

The operating policies are defined in terms of two parameters: (i) the bound on the post-TWC $NO_x$ emission index $EI_{NOx,lim}(k_1)$, to be precisely defined hereinafter; and (ii) the purge activation threshold (PAT). The parameters $EI_{NOx,lim}(k_1)$ and (PAT) are optimized over the drive cycle and the policy that yields the least fuel consumption under the specified constraint on $NO_x$ emissions is selected.

The parameter $EI_{NOx,lim}(k_1)$ is used to generate a calibration that governs the engine operation in the normal mode.

Specifically, for each engine speed/engine torque operating point on a selected grid ($w^i$, i=1, . . . , M) this normal mode calibration minimizes the fuel consumption subject to (i) a constraint on the $NO_x$ emission index of the form $$EI = \frac{\hat{W}_{NOx}}{W_f} \leq EI_{NOx,\text{lim}(kI)},$$

(ii) constraints (5), and (iii) constraints on the engine feedgas properties such as temperature and mass flow rate needed to sustain the effective trapping capacity of the LNT above a prescribed threshold. Here $\hat{W}_{NOx}$ is the estimated mass flow rate of NOx out of the TWC assuming "steady-state" conversion efficiencies of the TWC, i.e., that the oxygen storage dynamics of the TWC are at an equilibrium. In practice, the need to interpolate smoothly between calibration values at the grid points requires that three separate calibrations (stoichiometric, lean homogeneous and lean stratified) for the normal mode be generated. The difference in these three calibrations is due to assumed ranges of the air-to-fuel ratio and injection timing. For example, the stoichiometric calibration corresponds to the air-to-fuel ratio near stoichiometry and early injection, the homogeneous lean calibration corresponds to lean air-to-fuel ratio and early injection while the stratified lean calibration corresponds to lean air-to-fuel ratio and late injection. For a given $w_i$, not all of these calibrations may exist. For example, stratified operation is only possible at low engine and torque values. The values for each of the three calibrations $$u^{st}(w, EI_{NOx,lim}(k_1)),$$

$$u^{hl}(w, EI_{NOx,lim}(k_1))$$

and $$u^{sl}(w, EI_{NOx,lim}(k_1))$$

obtained on a grid of points $w^i$, i=1, . . . , M, are interpolated to generate the values of the calibrations for arbitrary w. During the normal mode operation, if w and $EI_{NOx,lim}(k_1)$ are given, then out of the three vectors $$u^{st}(w, EI_{NOx,lim}(k_1)),$$

$$u^{hl}(w, EI_{NOx,lim}(k_1))$$

and $$u^{sl}(w, EI_{NOx,lim}(k_1))$$

the one is selected that provides the least fuel consumption. If w falls outside the existence range for one of the calibrations, then this calibration is not taken into consideration during the selection process.

During the LNT purge mode, a different purge calibration is employed. This purge calibration maximizes the estimated mass flow rate of CO out of the TWC, $\tilde{W}_{CO}$, assuming the "steady-state" conversion efficiencies of the TWC. Since the LNT purge involves reactions of CO with NOx stored in the trap, maximizing $\tilde{W}_{CO}$, ensures that the LNT purge is accomplished as rapidly as possible. Additional constraints are introduced to reflect the fact that the LNT purge can only take place when the engine is operated under homogeneous combustion and with rich of stoichiometry air-to-fuel ratio.

The parameter PAT is used to define the transition policy between the normal mode and the purge mode. Whenever $x_{lnt}$ exceeds PAT during the normal mode operation the transition to the purge mode is activated. The normal operation resumes when $x_{lnt}$ falls below a specified threshold that in this embodiment is considered fixed.

The following regressions are pre-generated prior to execution of the routine for generating the calibrations discussed below in connection with FIG. 3. From steady-state engine dynamometer mapping, data regressions are generated for feedgas mass flow rates of $NO_x$ ($W_{NOx,fdgs}$), CO ($W_{CO,fdgs}$), HC ($W_{HC,fdgs}$), covariance of IMEP COV, fueling rate ($W_f$), LNT temperature ($T_{lnt}$) as a function of air-to-fuel ratio (afr), spark timing (spark), EGR rate (egr-rate), engine speed (rpm), engine torque (trq) and combustion mode (stratified or homogeneous). In addition, the steady-state efficiencies of Three-Way-Catalyst, $\eta_{NOx}$, $\eta_{CO}$, $\eta_{HC}$ are regressed as functions of the air-to-fuel ratio. These efficiencies relate feedgas mass flow rates and post-TWC mass flow rates as:

$$W_{i,post-TWC} = \eta_i(afr) W_{i,fdgs}, \; i \in \{NOx, CO, HC\}.$$

Finally, a regression is generated for LNT fraction of total available capacity (FTAC) as a function of LNT temperature, $T_{LNT}$. The "regression" mentioned above refers to a function whose coefficients are calculated to best match the experimental data. For example, the regression for FTAC as a function of $T_{LNT}$ has the form:

$$FTAC(T_{LNT}) = 1/(c_0 + c_1 T_{LNT} + c_2 T_{LNT}^2 + c_3 T_{LNT}^3 + c_4 T_{LNT}^4),$$

where $c_0, c_1, c_2, c_3, c_4$ are coefficients obtained to best match the experimental data.

Figure 3:
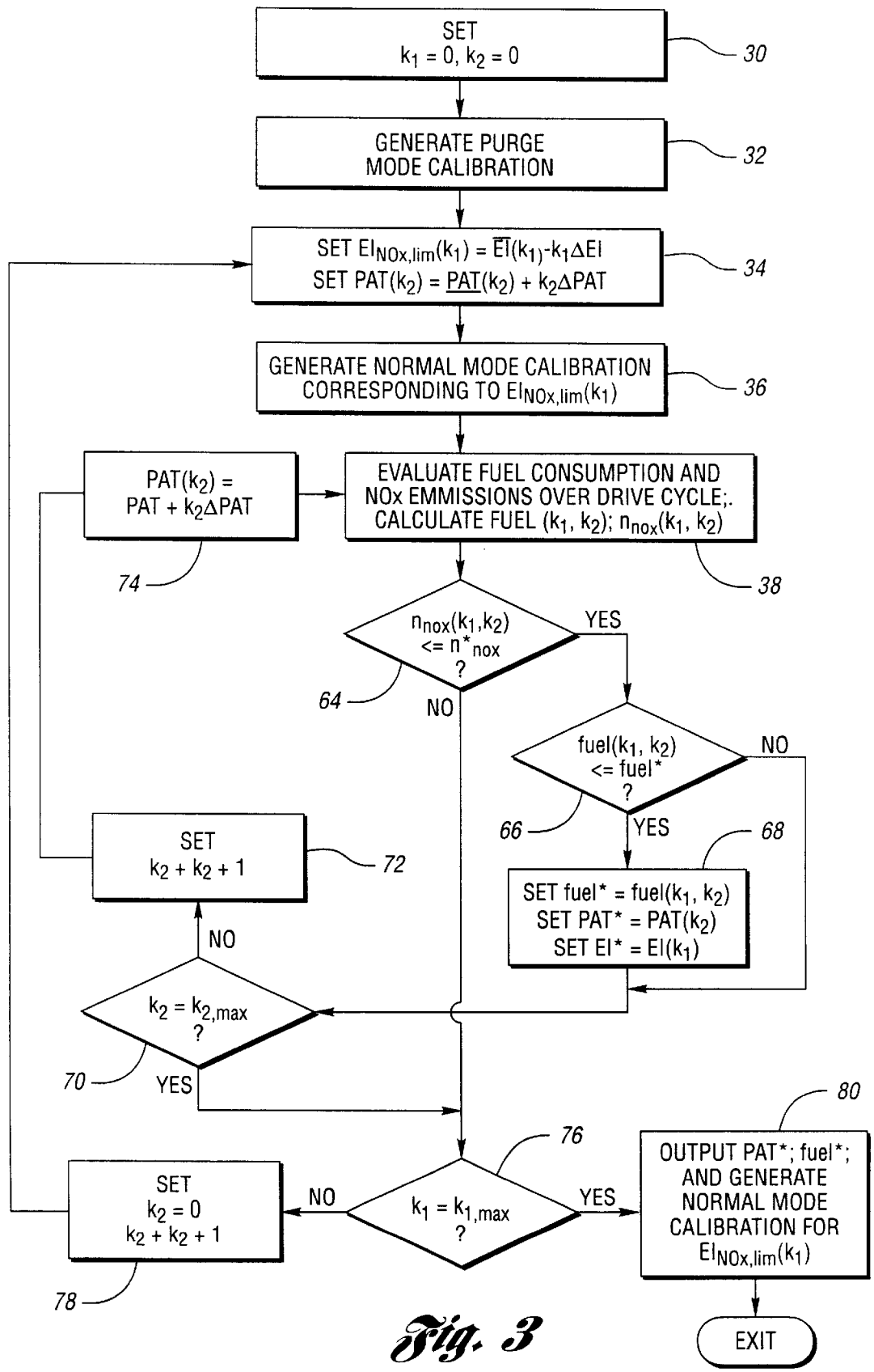
FIG. 3 is an overall flowchart of the method of the present invention.

Referring now to FIG. 3, a flowchart of the calibration optimization method is shown. At block 30 an initialization step is performed where integer indices $k_1$ and $k_2$ are reset to $k_1=0$ and $k_2=0$. The emission index bound i.e. $EI_{NOxlim}(k_1)$ and purge activation threshold $PAT(k_2)$ are adjusted as in block 34 as $k_1$ and $k_2$ are adjusted by the optimization method. At block 32, a purge mode calibration is generated based on the engine model. For each engine speed and torque grid point rpm(i), trq(j), $i=1, \ldots, N_i$, $j=1, \ldots, N_2$ a calibration for purge mode (l=0) is determined.

Generating Purge Mode Calibration

The EGR rate is zero during purge while the rest of the calibration settings (air-to-fuel ratio (afr), spark timing (spark)) are generated via the solution of the following optimization problem:

$$W_{CO,post-TWC} \to \max$$

subject to $$COV \leq COV_{max},$$

$$afr_{min}(l) \leq afr \leq afr_{max}(l),$$

where l=0 for purge calibration. Thus, the flow of CO past the TWC is maximized subject to constraints of acceptable engine roughness and air-to-fuel ratio to accomplish purge as fast as possible. The air-to-fuel ratio limit $afr_{max}(0)$ is slightly less than stoichiometric as it corresponds to rich operation.

Regressions are used for the homogeneous mode. As before a search is made for the air-to-fuel ratio and spark timing settings over a grid. The purge calibration does not depend on $EI_{NOx,lim}(k_1)$ and, hence, it can be pre-generated once and then stored. Evaluating the regressions at the optimal normal mode calibration the values of optimal feedgas emissions $$W_{NOx,fdgs}*(i,j,0,k_1), W_{CO,fdgs}*(i,j,0,k_1), W_{HC,fdgs}*(i,j,0,k_1);$$

total feedgas flow rate $W_{tot}*(i,j,0,k_1)$; and LNT temperature $T_{LNT}*(i,j,0,k_1)$ are obtained.

At block 34, the emission index bound $EI_{NOx,lim}(k_1)$ is set to the upper limit and PAT is set to the lower limit. At block 36, three calibrations for normal mode: stratified (l=1), homogeneous lean (l=2), stoichiometric (l=3) are generated corresponding to $EI_{NOx,lim}(k_1)$ which initially is the upper limit. At block 38, an evaluation over the drive cycle is performed where the tailpipe $NO_x$ emission and fuel economy are calculated for the specified drive cycle. An inner loop optimization routine, forces the calibrations for normal mode to yield a post-TWC $NO_x$ emission index of no more than $EI_{NOx,lim}(k_1)$.

Generation of Normal Mode Calibrations

Given $EI_{NOx,lim}(k_1)$, three calibrations are generated at block 36, for the normal mode: stratified lean, homogeneous lean and homogeneous stoichiometric. As used here, "calibration" refers to the settings of air-to-fuel ratio, EGR rate, and spark timing for each speed-torque pair rpm(i), trq(j) from the grid. The calibration settings are generated to solve the following optimization problem wherein fuel consumption is minimized subject to constraints on post TWC $NO_x$ emission index to be less than $EI_{NOx,lim}(k_1)$, constraints on engine roughness, fraction of total available capacity of LNT and air-to-fuel ratio:

$$W_f \to \min$$

subject to $$EI_{NOx,post-TWC} = \frac{W_{NOx,post-TWC}}{W_f} \leq EI_{NOx,lim}(k_1),$$

$$COV \leq COV_{max},$$

$$FTAC \geq FTAC_{min},$$

$$afr_{min}(l) \leq afr \leq afr_{max}(l),$$

where l=1 for stratified lean calibration, l=2 for homogeneous lean calibration and l=3 for homogeneous stoichiometric calibration. Thus, the only difference in the process of generating the three calibrations is in the air-to-fuel ratio limits, i.e., $afr_{min}(l)$, $afr_{max}(l)$, and the fact that regressions depend on the combustion mode. As described previously, regressions are used in solving this optimization problem. The inequality on the IMEP covariance COV is meant to limit the engine roughness. The inequality on the FTAC is meant to always allow a minimum capacity of LNT which is equal to $FTAC_{min}$.

The optimization can be performed through a search over the values of air-to-fuel ratio, EGR rate and spark timing over a grid. The optimal values of the (feedgas) air-to-fuel ratio, EGR rate and spark timing are denoted by afr* (i, j, l, $k_1$), spark* (i, j, l, $k_1$), egr-rate* (i,j,l,$k_1$). Evaluating the regressions at the optimal normal mode calibration we obtain the values of optimal feedgas emissions $$W_{NOx,fdgs}*(i,j,l,k_1), W_{CO,fdgs}*(i,j,l,k_1), W_{HC,fdgs}*(i,j,l,k_1);$$

total feedgas flow rate $W_{tot}*(i,j,l,k_1)$; and LNT temperature $T_{LNT}*(i,j,l,k_1)$. These multidimensional tables are needed in the drive cycle evaluation indicated at block 38.

As stated, three different calibrations for the normal mode, corresponding to different values of l are developed instead of merging them together based on the best fuel economy. The reason is rather subtle and has to do with the need to interpolate between the values stored in these tables during drive cycle evaluation in block 38. The interpolation in a single, merged table may result in physically impossible values which is avoided by interpolating within each of the individual tables and then selecting one of the three resulting values that corresponds to the best fuel economy.

Note that the normal mode calibrations generated in the process of the inner loop optimization depend on the emission index limit $EI_{NOx,lim}(k_1)$ which is adjusted in the process of the outer loop optimization. A parameter other than $EI_{NOx,lim}$ can be used if desired. The only requirement is that decreasing the parameter results in a decrease of steady-state post-TWC $NO_x$ emissions. For example, suppose we first optimize the engine for best fuel economy and suppose that post-TWC $NO_x$ emissions for each rpm-torque cell rpm(i), torque(j) are $W_{NOx,post-TWC}^{bfc}(i,j)$. Then, in the process of generating the normal mode calibrations, instead of the constraint $$EI_{NOx,post-TWC} = \frac{W_{NOx,post-TWC}}{W_f} \leq EI_{NOx,lim}(k_1),$$

we can impose a constraint $$W_{NOx,post-TWC} \leq \theta(k_1) \cdot W_{NOx,post-TWC}^{bfc}(i,j),$$

where $\theta(k_1)$ is the parameter that is used in place of $EI_{NOx,post-TWC}$. Or we can even minimize the cost of the form $$\theta(k_1)W_f + W_{NOx,post-TWC} \qquad 5$$

instead of minimizing just $W_f$ and remove an inequality constraint on $W_{NOx,post-TWC}$ altogether.

Evaluation Over the Drive Cycle

In block 38, the tailpipe $NO_x$ emissions and fuel consumption are evaluated over specified second-by-second trajectories of the engine speed rpm(t) and engine torque trq(t) t=1, ..., $T_f$ that correspond to a particular drive cycle. The total tailpipe $NO_x$ emissions over the cycle $M_{NOx}(T_f)$ (gram) and fuel consumption $M_f(T_f)$ (gram) are converted to an average of tailpipe emissions of $NO_x$, $n_{nox}(k_1,k_2)$ (g/km) and an average fuel consumption number, fuel $(k_1,k_2)$ (g/km).

Figure 4:
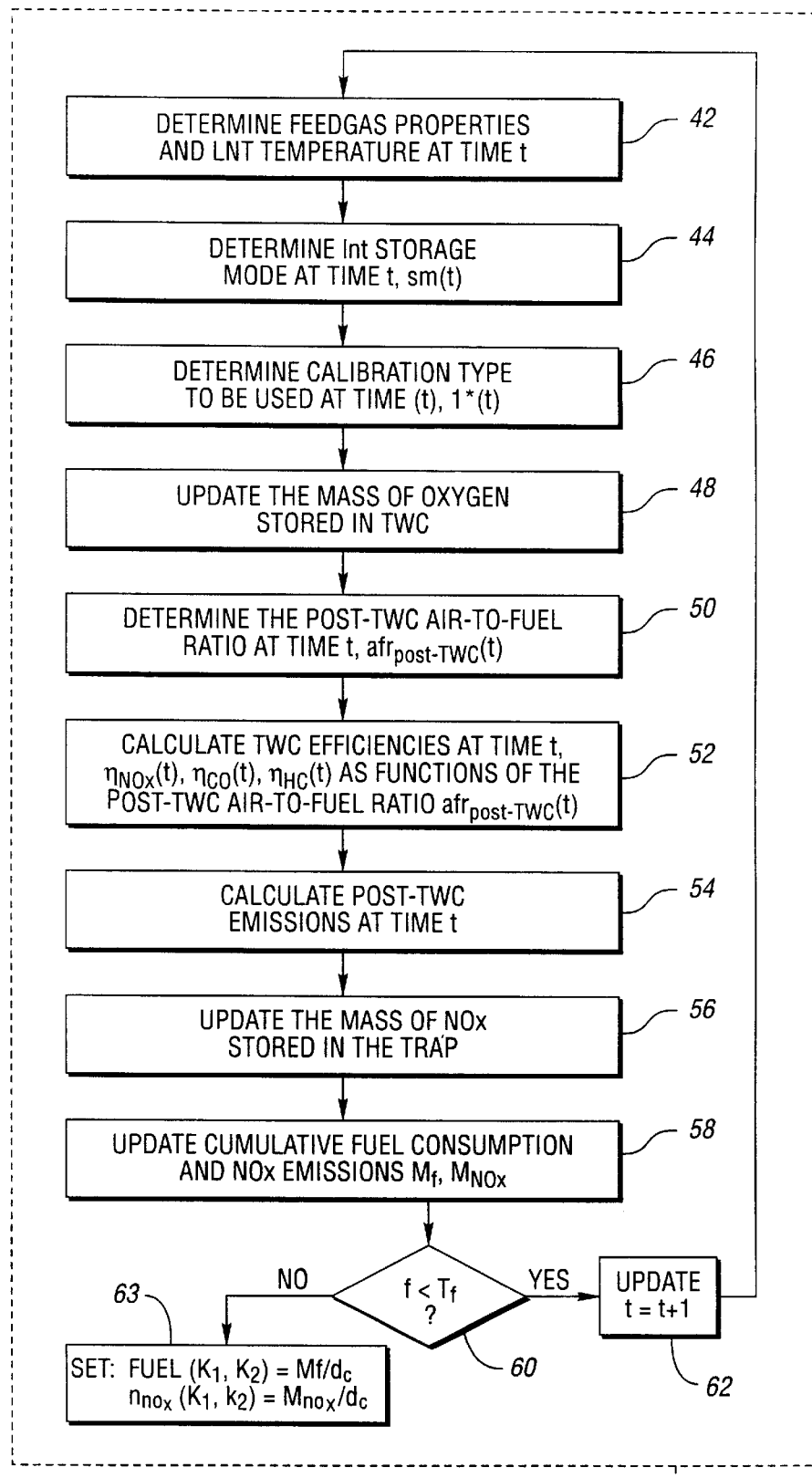
FIG. 4 is a more detailed flowchart of the steps performed during the drive cycle evaluation.

Referring now to FIG. 4, the drive cycle evaluation of block 38 is shown in greater detail. In the following discussion let $m_{NOx}$ denote the mass of NOx stored in the LNT and $m_{O2}$ denote the mass of oxygen stored in the TWC at a time t. Initialize $m_{NOx}(0)=0$, $m_{O2}(0)=0$, $M_f(0)=0$, $M_{NOx}(0)=0$, t=1. Set LNT storage mode as sm(0)=0 (normal mode). The feedgas properties and LNT temperature at time t of the drive cycle are determined as indicated in block 42. Given rpm(t) and trq(t), the following are calculated in block 42;

a) the fuel consumption (in gram-per-sec),
b) feedgas $NO_x$, CO and HC emissions (in gram-per-sec),
c) total exhaust gas flow rate (in gram-per-sec),
d) feedgas air-to-fuel ratio and LNT temperature for all three normal modes (stratified lean, homogeneous lean and stoichiometric) and the purge mode (i.e. for all l=0,1,2,3). This is accomplished by interpolating within the lookup tables $W_f*(i,j,l,k_1)$, $W_{NOx,fdgs}*(i,j,l,k_1)$, $W_{CO,fdgs}*(i,j,l,k_1)$, $W_{HC,fdgs}*(i,j,l,k_1)$, $afr*(i,j,l,k_1)$, $T*_{LNT}*(i,j,l,k_1)$) generated in the inner loop optimization for the emission index $EI_{NOx,lim}(k_1)$. Let the corresponding variables be denoted by $W_{f,l}(t)$, $W_{NOx,fdgs,l}(t)$, $W_{CO,fdgs,l}(t)$, $W_{HC,fdgs,l}(t)$, $W_{tot,fdgs,l}(t)$, $afr_{fdgs,l}(t)$ and $T_{LNT,l}(t)$.

At a given time instant t, it may not be feasible to operate in certain ones of the normal modes l=1, 2, 3. The mode l is deemed infeasible at time t if rpm(t), trq(t) do not fall within a rectangle, all corners of which are feasible grid points for the mode l. The corners of the rectangle are included in the grid points from rpm(i), trq(j), i=1, ..., $N_1$, j=1, ..., $N_2$,). Some of the grid points can be infeasible for a given mode l because the emission index constraint determined by $EI_{NOx,lim}(k_1)$ is not met or the minimum LNT fraction of total available capacity FTAC is less than $FTAC_{min}$ or other constraints are violated. Let $feas_l(t)=0$ if normal mode l is not feasible and $feas_l(t)=1$ if normal mode l is feasible.

At block 44, the LNT storage mode at time t, sm(t), is determined. If the estimated mass of $NO_x$ stored in the trap at time t exceeds $PAT(k_2)$, i.e, $m_{NOx}(t) > PAT(k_2)$, and sm(t-1)=0, start purging, i.e., set sm(t)=1. If estimated mass of $NO_x$ stored in the trap at time t is below the purge deactivation threshold, i.e., $m_{NOx}(t) < PDT$ and sm(t-1)=1, stop purging, i.e., set sm(t)=0.

At block 46, the calibration type to be used at time t, l*(t),—stratified lean, homogeneous lean, stoichiometric or purge is determined. If the system is in purge mode (sm(t)=1), then the purge calibration is used (l*(t) is set to 0). If the system is in a normal mode (sm(t)=0), then a normal mode calibration is selected (l*(t) is set to a value of l=1, 2 or 3) at time t which corresponds to a feasible calibration and the smallest fuel consumption ($W_{f,l}(t)$ is smallest among all l such that $feas_l(t)=1$).

At block 48, the mass of oxygen stored in TWC is updated in accordance with the following equation.

$$m_{O2}(t) = \min\left\{\max\left\{m_{O2}(t-1) + 0.21 \times W_{tot,fdgs,l*(t)}(t) \times \frac{(afr_{fdgs,l*(t)}(t) - 14.64)}{(1 + afr_{fdgs,l*(t)}(t))}, 0\right\}, C_{TWC}\right\},$$

where $C_{TWC}$ is the maximum oxygen storage capacity of TWC.

At block 50, the post-TWC air-to-fuel ratio at time t, $afr_{post-TWC}(t)$, is determined. If $m_{O2}(t)=0$ or $m_{O2}(t)=1$, then $afr_{post-TWC}(t) = afr_{fdgs,l*(t)}(t)$; otherwise if $m_{O2}$ is in-between 0 and 1, $afr_{post-TWC}(t) = 14.64$ (stoichiometric value).

At block 52, the TWC efficiencies at time t, $\eta_{NOx}(t)$, $\eta_{CO}(t)$, $\eta_{HC}(t)$ as functions of the post-TWC air-to-fuel ratio $afr_{post-TWC(t)}$, is calculated.

At block 54, the post-TWC emissions at time t is calculated in accordance with the following equation.

$$W_{NOx,post-TWC}(t) = \eta_{NOx}(t) \times W_{NOx,fdgs,l*(t)}(t),$$

$$W_{CO,post-TWC}(t) = \eta_{CO}(t) \times W_{CO,fdgs,l*(t)}(t),$$

$$W_{HC,post-TWC}(t) = \eta_{HC}(t) \times W_{HC,fdgs,l*(t)}(t),$$

At block 56, the mass of $NO_x$ stored in the trap is updated. If sm(t)=1 (purge mode), the mass of $NO_x$ stored in the trap is updated according to $$m_{NOx}(t) = \max\{0, m_{NOx}(t-1) - k_3 W_{CO,post-TWC}(t) - k_4 W_{HC,post-TWC}(t)\},$$

where $k_3$, $k_4$ are the reductant utilization fractions. If sm(t)=0 (normal mode), the fill rate constant for the LNT is calculated according to $$r_{fill}(t) = (1 - \eta_{cceT}) \times \alpha_T / FTAC(T_{LNT,l*(t)}(t)),$$

where $\eta_{cceT}$ is the catalytic conversion efficiency of LNT, $\alpha_T$ is the trapping rate constant of the LNT and the mass of $NO_x$ stored in the trap is updated according to:

$$m_{NOx}(t) = FTAC(T_{LNT,l*(t)}(t)) + (m_{NOx}(t-1) - FTAC(T_{LNT,l*(t)}(t)))e^{-r_{fill}(t)}.$$

At block 58, the cumulative fuel consumption and $NO_x$ emissions $M_f, M_{NOx}$ are updated according to the following equations:

$$M_f(t) = M_f(t-1) + W_{f,l*(t)}(t)$$

$$M_{NOx}(t) = M_{NOx}(t-1) \text{ if } sm(t)=1,$$

$$M_{NOx}(t) = M_{NOx}(t-1) + (\eta_{cceT} \times W_{NOx,post-TWC}(t) - (m_{NOx}(t) - m_{NOx}(t-1))$$
if sm(t)=0.

As indicated in decision block 60, if $t < T_f$, then t is incremented at block 62 to t=t+1. The drive cycle evaluation is a predetermined interval and is completed at t=$T_f$. At block 63 the fuel value $fuel(k_1,k_2)$ is set to $M_f/dc$ and the emissions value $n_{nox}(k_1,k_2)$ is set to $M_{nox}/dc$ where dc is the drive cycle distance (approximately 11 km).

The drive cycle optimization just described may be repeated for several different variants of the initialization of $m_{nox}(0)$, $m_{CO}(0)$, sm(0) (to zero and not-zero values) and the fuel economy and $NO_x$ emission results may be averaged over several runs. Also, in block 56 the thermal inertia of the LNT may be included by filtering FTAC through a first order filter, i.e., $$z(t)=\lambda z(t-1)+(1-\lambda)FTAC(T_{LNT},l^*(t))$$

and using $z(t)$ in place of $FTAC(T_{LNT,l^*(t)}(t))$ in the updates.

Referring again to FIG. 3 a decision block 64 checks whether the average tailpipe emissions of $NO_x$, i.e., $n_{nox}(k_1;k_2)$, calculated during drive cycle evaluation is less than or equal to an allowed limit $n^*_{nox}$. If so, the fuel consumption over this drive cycle (fuel $(k_1;k_2)$) is compared to a minimum fuel consumption value (fuel*) at block 66. If less than or equal to fuel* then at block 68 fuel* is set to the fuel consumption value calculated during the previous drive cycle at block 58 and PAT* and $EI^*_{NOx,lim}(k_1)$ are set to the existing values calculated in block 34. The values for fuel*, PAT* and $EI^*_{NOx,lim}$ will be output along with the normal mode calibration generated at block 36 when the optimization routine is completed. Regardless of the path taken at decision block 66, the value of $k_2$ is compared with $k_{2,max}$ value at block 70. Until the maximum value of $k_2$, a predetermined value at which further optimization attempts are not justified, is reached, $k_2$ is incremented at block 72 and the purge activation threshold is increased at block 74. The fuel economy and $NO_x$ emissions over the drive cycle are then determined at block 38. When $n_{nox}(k_1,k_2)$ is greater than $n^*_{nox}$ or $k_2$ is equal to $k_{2,max}$, then if $k_1$ is not equal to $k_{1max}$, as determined at block 76, then $k_2$ is reset and and $k_1$ is incremented and flow returns to block 34 where the emission index is decremented and new normal mode calibrations are generated at block 36 for use in evaluating fuel economy and emission over the drive cycle at block 38. When $k_1=k_{1,max}$, then the values of fuel*, $EI^*_{NOx,lim}$, and PAT* are output at block 80. The normal mode calibration data at the value of $EI^*_{NOx,lim}$ is also output for use in populating lookup calibration tables.

Thus, the program initially sets the purge activation threshold to a small value and admissible emission index of $NO_x$ to a large value. The value of the emission index and $k_1$ are maintained while the value of purge activation threshold is gradually increased ($k_2$ is incremented) until the $NO_x$ emissions are at the limit, i.e, $n_{nox}(k_1,k_2)$ is approximately equal to $n^*_{nox}$. After that, the value of the emission index is gradually reduced ($k_1$ is incremented) and the procedure of increasing purge activation threshold from a small value is repeated.

While the best mode for carrying out the present invention has been described in detail, those familiar with the art to which this invention relates will recognize various alternative designs and embodiments for practicing the invention as defined by the following claims.

What is claimed is:

1. A method of optimizing the desired set-points for engine operating variables for an engine with a trap located in the engine exhaust path, said method comprising a sequence of the following steps:

generating set-points for engine operating variables as functions of engine speed and engine torque based on a finite number of parameters that affect engine and aftertreatment operation;

utilizing the values of said set-points to determine fuel consumption and exhaust emissions over a predetermined drive cycle using engine and aftertreatment models;

adjusting the values of said parameters to obtain optimized parameters corresponding to minimum fuel consumptions within predetermined emission constraints and outputting the desired set-point values in tables corresponding to said optimized parameters.

2. The method of 1 wherein said trap is located downstream of said catalyst.

3. The method of claim 1 wherein said trap is a $NO_x$ trap, said exhaust emissions are emissions of $NO_x$ and said constraints are $NO_x$ emission constraints.

4. The method of claim 3 wherein said trap is located downstream of said catalyst.

5. A method of optimizing the desired set-points for engine operating variables for an engine with a trap located in the engine exhaust path downstream from a catalyst, said method comprising a sequence of the following steps:

generating set-points for engine operating variables as functions of engine speed and engine torque based on parameters that include a post-TWC $NO_x$ emission index bound ($EI_{NOx,lim}$) and a purge activation threshold(PAT) for a plurality of normal mode calibrations including stoichiometric, lean homogeneous and lean stratified modes of engine operation and a single purge mode calibration;

utilizing the values of said set-points to determine fuel consumption and $NO_x$ exhaust emissions over a predetermined drive cycle using engine and aftertreatment models;

adjusting the values of said parameters to obtain optimized parameters corresponding to minimum fuel consumptions within predetermined emission constraints and outputting the desired set-point values in tables corresponding to said optimized parameters and outputting said purge activation threshold.

6. A method of optimizing calibration tables of engine operating variables for an engine with a $NO_x$ trap located in the engine exhaust path downstream of a catalyst, said method comprising a sequence of the following steps:

generating calibration tables based on a finite number of parameters that affect engine and aftertreatment operation;

utilizing the values in said generated tables in a model of said engine to determined fuel consumption and $NO_x$ emission over a predetermined drive cycle;

adjusting the values of said parameters to obtain optimized parameters corresponding to minimum fuel consumption within predetermined $NO_x$ emission constraints over said drive cycle; and outputting calibration table data obtained from said optimized parameters.

7. The method of claim 6 wherein tables for a plurality of normal mode calibrations and a single purge mode calibration are generated.

8. The method of claim 7 wherein the normal mode calibrations include stoichiometric, lean homogeneous and lean stratified modes of engine operation.

9. The method of claim 7 where the optimization is performed by searching through values of air-to-fuel ratio, spark timing, and EGR rate over a specified grid to determine those values that minimize fuel consumption while satisfying a constraint on $NO_x$ emission index for the normal mode operation; and those values that minimize the purge time for the purge mode calibrations.

10. The method of claim 9 where the minimization of the purge time is achieved by maximizing CO emissions.

11. The method of claim 6 wherein one of said parameters is a post-TWC $NO_x$ emission index bound ($EI_{NOx,lim}$).

12. The method of claim 11 wherein another one of said parameters is a purge activation threshold (PAT).

13. The method of claim 12 wherein said adjusting step includes the steps of:
adjusting the value of the purge activation threshold while maintaining the value of the emission index constant until said determined amount of $NO_x$ emission is equal to a predetermined $NO_x$ emission bound; and thereafter
adjusting the value of the emission index bound and repeating the step of adjusting the value of the purge activation threshold.

14. The method of claim 13 wherein the normal mode calibrations are generated in an inner loop optimization process and the emission index bound and purge activation threshold are adjusted in an outer loop optimization process.

15. The method of claim 6 wherein the step of adjusting the values of said parameters includes using a predetermined optimization algorithm.

16. The method of claim 6 wherein the step of adjusting the values of said parameters comprises searching over a grid of possible parameter values.

17. The method of claim 16 wherein said searching is performed by an optimization algorithm.

18. The method of claim 6 wherein said adjusting step includes the steps of:
optimizing the tables for best fuel economy; and generating a plurality of normal mode calibration tables using a constraint $$W_{NOx,post\text{-}TWC} \leq \theta(k_1) \cdot W_{NOx,post\text{-}TWC}^{bfc}(i,j),$$

where $\theta(k_1)$ is a parameter that decreases the steady-state post-catalyst $NO_x$ emissions as its value is decreased;
and adjusting $\theta(k_1)$ over said drive cycle.

19. The method of claim 6 wherein the step of evaluating fuel economy and emissions over a drive cycle is achieved by simulating LNT $NO_x$ storage and TWC oxygen storage models over a drive cycle.

20. The method of claim 6 wherein the step of determining fuel economy and emissions over a drive cycle is achieved by selecting at each time instant of the drive cycle either a stoichiometric, homogeneous lean or stratified lean calibration values for air-to-fuel ratio, EGR rate and spark timing based on the best fuel economy.

* * * * *